(12) United States Patent
Stein

(10) Patent No.: US 6,661,607 B2
(45) Date of Patent: Dec. 9, 2003

(54) METHOD AND APPARATUS FOR ELECTROMAGNETIC INTERFERENCE REDUCTION IN MAGNETIC RECORDING DEVICES

(75) Inventor: Anatoli B. Stein, Los Altos, CA (US)

(73) Assignee: Guzik Technical Enterprises, Mountain View, CA (US)

( * ) Notice: Subject to any disclaimer, the term of this patent is extended or adjusted under 35 U.S.C. 154(b) by 90 days.

(21) Appl. No.: 10/040,531

(22) Filed: Jan. 7, 2002

(65) Prior Publication Data

US 2003/0090836 A1 May 15, 2003

Related U.S. Application Data

(60) Provisional application No. 60/289,849, filed on May 9, 2001.

(51) Int. Cl.[7] ................................. G11B 5/11
(52) U.S. Cl. ....................................... 360/128
(58) Field of Search ........................... 360/128

(56) References Cited

U.S. PATENT DOCUMENTS

| 4,646,180 | A | | 2/1987 | Ohtsubo |
| 4,673,996 | A | | 6/1987 | White |
| 4,870,519 | A | | 9/1989 | White |
| 4,893,204 | A | | 1/1990 | Yamada et al. |
| 4,894,740 | A | | 1/1990 | Chhabra et al. |
| 5,200,868 | A | | 4/1993 | Chapin et al. |
| 6,150,813 | A | * | 11/2000 | Schadewald et al. ........ 360/128 |
| 6,157,516 | A | * | 12/2000 | Hertrich et al. ............. 360/128 |
| 6,359,750 | B1 | * | 3/2002 | Hughbanks et al. ......... 360/128 |

* cited by examiner

Primary Examiner—Robert S. Tupper
(74) Attorney, Agent, or Firm—McDermott, Will & Emery

(57) ABSTRACT

In a magnetic recording/reproduction device, such as a disk drive one or more conductive elements is positioned in close proximity to a recording/reproduction head in order to absorb EMI generated by the head as it reads and/or writes data from/to magnetic media. The conductive element is connected through a low impedance path to an electrical sink, such as ground, for absorbed EMI. The conductive element thereby significantly reducing EMI in a manner analogous to the operation of a groundplane in a circuit board. In a disk drive implementation, the conductive element may be positioned on the opposite side of the disk from the head, on the same side of the disk as the head, or one or more conductive elements may be positioned on each side of the disk.

32 Claims, 5 Drawing Sheets

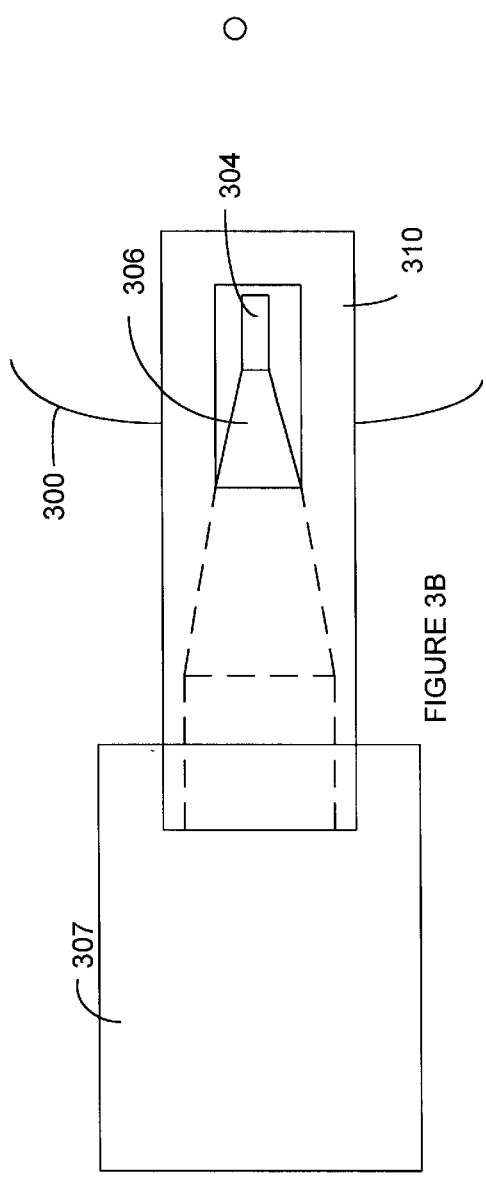
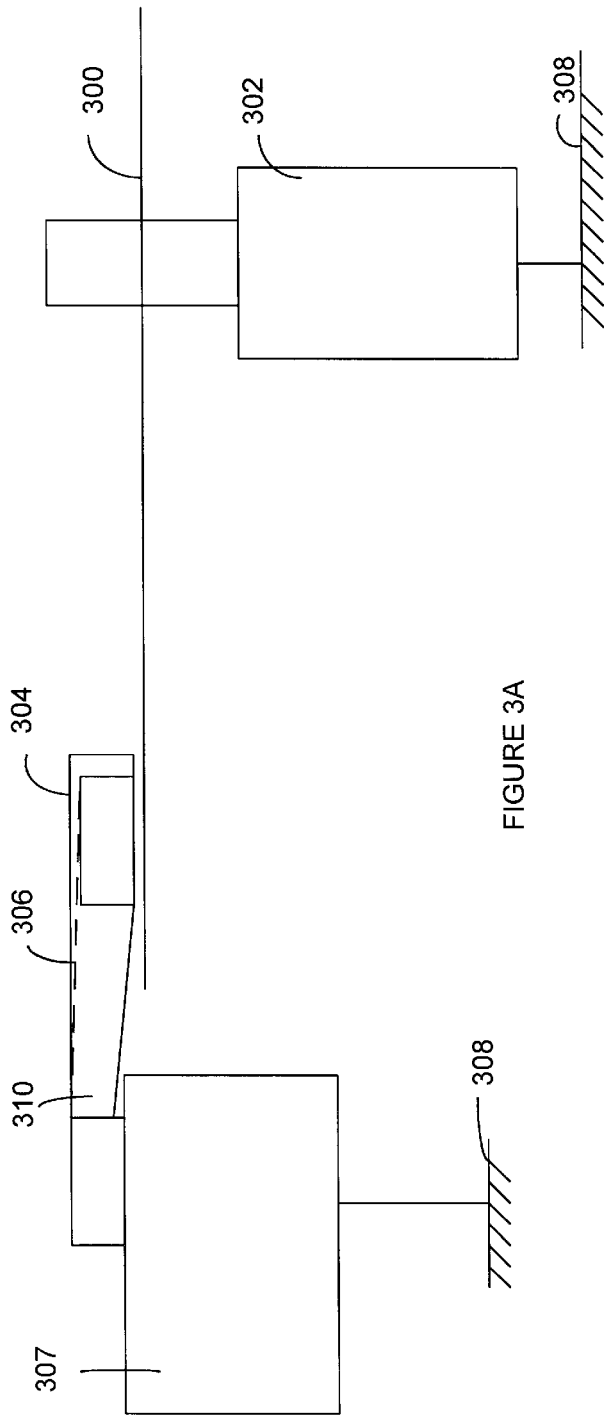
FIGURE 3B
FIGURE 3A

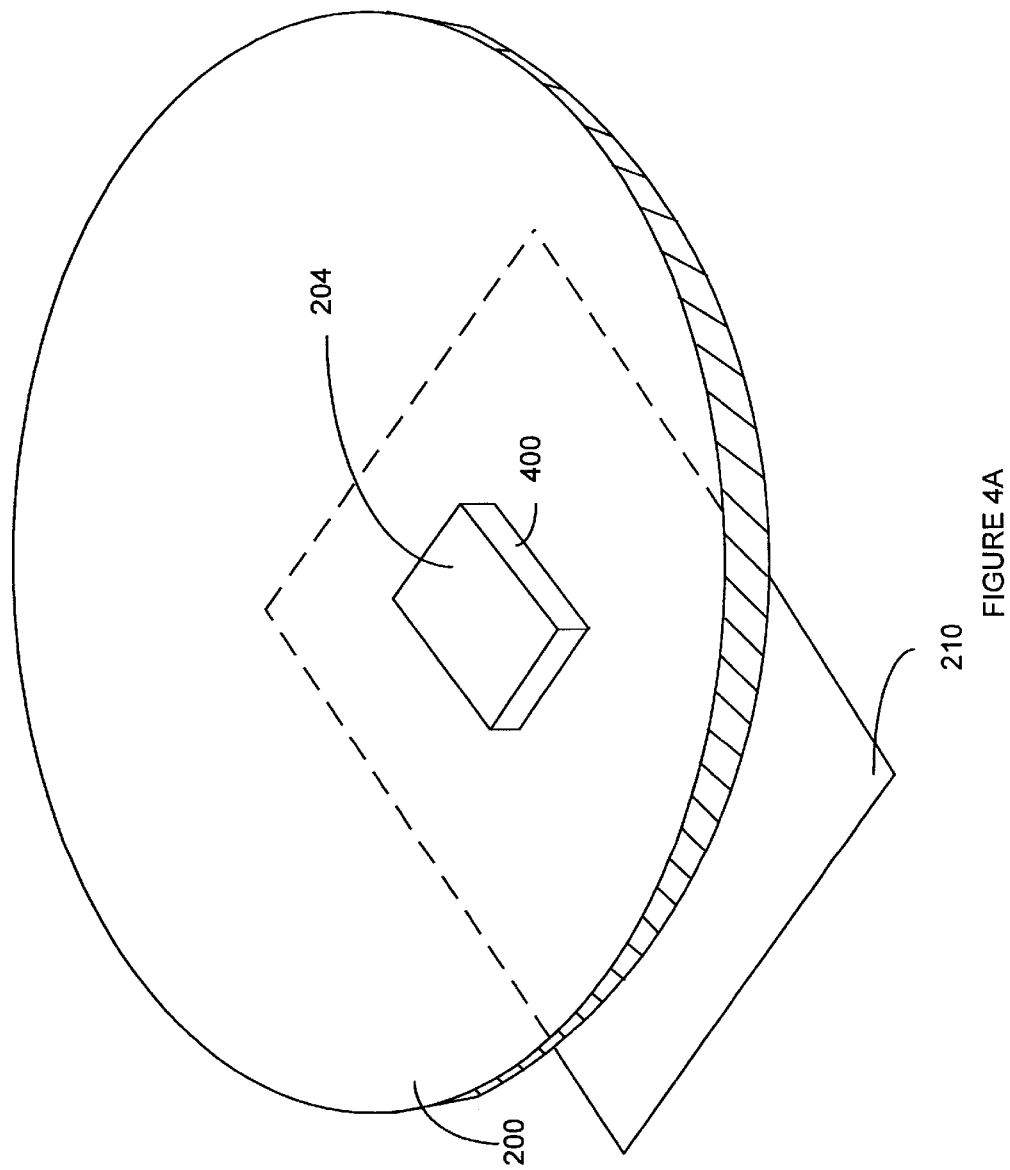

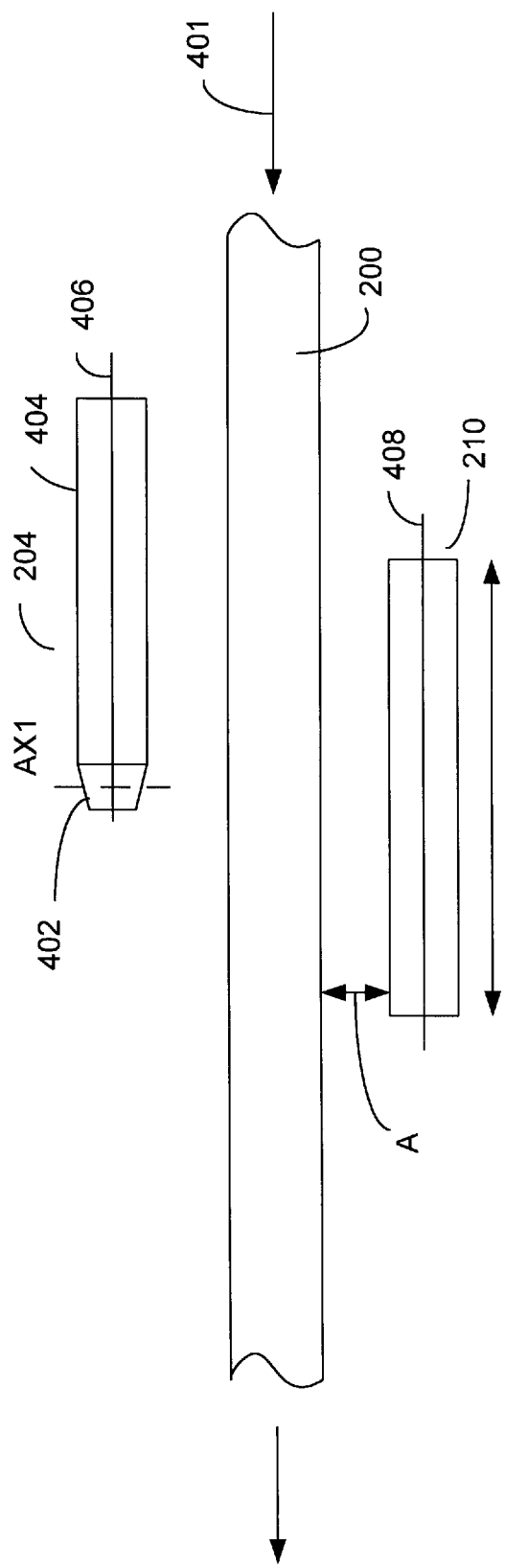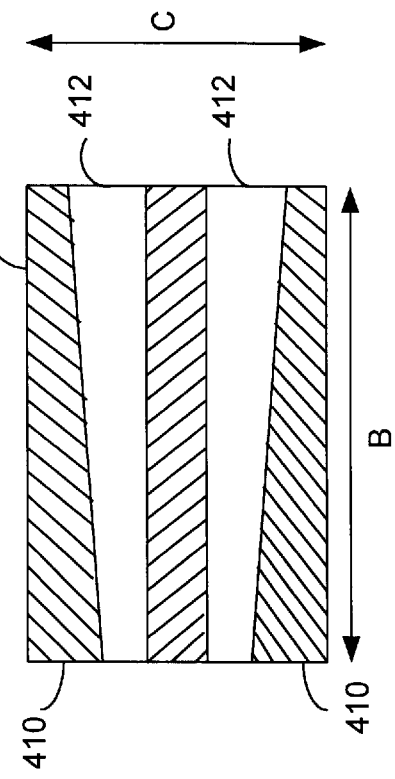

METHOD AND APPARATUS FOR ELECTROMAGNETIC INTERFERENCE REDUCTION IN MAGNETIC RECORDING DEVICES

CROSS REFERENCE TO RELATED APPLICATIONS

This application claims the benefit of U.S. Provisional Patent Application Ser. No. 60/289,849 filed May 9, 2001, entitled HIGH FREQUENCY INTERFERENCE REDUCTION METHOD AND APPARATUS FOR MAGNETIC RECORDING DEVICES, which application is hereby incorporated by reference in its entirety.

FIELD OF THE INVENTION

The invention relates to electromagnetic interference (EMI) and, more particularly, to the reduction of EMI in magnetic recording/reproduction devices.

BACKGROUND OF THE INVENTION

Magnetic recording/reproduction devices such as disk drives write information to and read information from a magnetic medium. In the case of disk drives, the information is written to and read from a rotating magnetic disk using a write head, read head, or read/write head which "flies" a very short distance above the disk, cushioned by an air bearing. Read, write, and read/write heads may be referred to hereinafter generically as disk heads, or, simply, heads. Heads often operate in close proximity to one another, sometimes reading and writing simultaneously. This is particularly true in a test center where a number of heads may be tested simultaneously. In such an environment there may be several test stations, each with a disk mounted on a spindle with corresponding read and write heads with technicians operationally testing disk drives, including heads. During a disk write operation, a write head emits electromagnetic interference (EMI) that may interfere with the operation of electronics and/or other heads. The disk upon which data is written may operate as an antenna, gathering EMI from a disk-write operation, from ambient radio or television signals, or from other sources. During the testing process the heads and media are typically exposed. That is, although it might be possible to enclose each test station within a separate "Faraday cage" in order to prevent the EMI (generated by a write head under test or another source) from interfering with a head being tested, such a construction would be impractical; particularly in view of the fact that test technicians would be enclosed in such "cages".

Additionally, in a disk drive application, the electromagnetic transducer in the head tends to emit electromagnetic interference (EMI) which may tend to interfere with the operation of other electronic devices. Although the disk drive enclosure may be shielded to suppress EMI emitted by the head, such shielding adds to the expense of disk drive enclosures. Even if the EMI is suppressed by a disk drive enclosure, the EMI may still interfere with the electronics contained within the enclosure.

A system and method for the suppression of EMI related to disk read and write operations would therefore be highly desirable.

SUMMARY

In a magnetic recording/reproduction device, such as a disk drive test station, in accordance with the principles of the present invention, one or more conductive elements is positioned in close proximity to a head in order to absorb EMI generated by the head as it reads and/or writes data from/to the magnetic media. A head typically includes an electromagnetic transducer that is attached to a head body. The body is formed to fly in very close proximity to the disk surface as the disk rotates "beneath" the head (Although the head may be located above or below the disk, for the clarity and convenience of description, the head will often be referred to as flying above the disk.) The conductive element provides a low impedance path to ground for absorbed EMI, thereby significantly reducing EMI. As used in the context of this document, the term "ground" may refer to any of a number of electromagnetic potentials, such as "system ground", "device ground", "cabinet ground", etc. used as a reference potential and which is generally designed to be at the same potential as earth ground, or earth potential.

The conductive element may be positioned on the opposite side of the disk from the head, on the same side of the disk as the head, or one or more conductive elements may be positioned on each side of the disk. The conductive element may make low-impedance contact with ground though a low-impedance connection to a disk-drive's loading arm, for example. The conductive element may be positioned in close proximity to the head by forming the element using much the same design and suspension as a flying head and "flying" the conductive element on the opposite side of the medium from the head at approximately the same distance from the disk surface as the head. Alternatively, a "non-flying" arrangement may be employed whereby the conductive element is positioned futher from the surface of the disk, on the order of a few mils, for example. In such and arrangement, the surface area of the conductive element may be increased, to a multiple of the head's surface area, for example, in order to compensate for the increased distance and maintain the capacitive coupling efficiency.

A conductive element in accordance with the principles of the present invention may also be formed to operate on the same side of the disk as the head. In such embodiments, the conductive element is placed in close proximity to the head's transducer in order to capacitively couple EMI created by the transducer. The conductive element may take on many forms. For example, the conductive element may be a small, substantially planar structure suspended between at least a portion of the head and the disk, it may be a structure that substantially envelopes the head, leaving an aperture for the operation of the transducer. That is, the conductive element is formed in close proximity to the head, in such a manner as to allow the read or write portion of the head to operate unimpeded while covering some remaining portion of the head. A conductive element in accordance with the principles of the present invention is particularly useful in a disk testing system that employs a plurality of heads, any number of which heads may be reading and/or writing simultaneously.

BRIEF DESCRIPTION OF THE DRAWINGS

The above and further features, aspects, and advantages of the invention will be apparent to those skilled in the art from the following detailed description, taken together with the accompanying drawings in which:

FIGS. 3A and 3B are diagrams of a "same side" conductive element embodiment in accordance with the principles of the present invention; and FIGS. 4A through 4C are detailed views of "opposite side" conductive element embodiments in accordance with the principles of the present invention.

DETAILED DESCRIPTION

Figure 1:
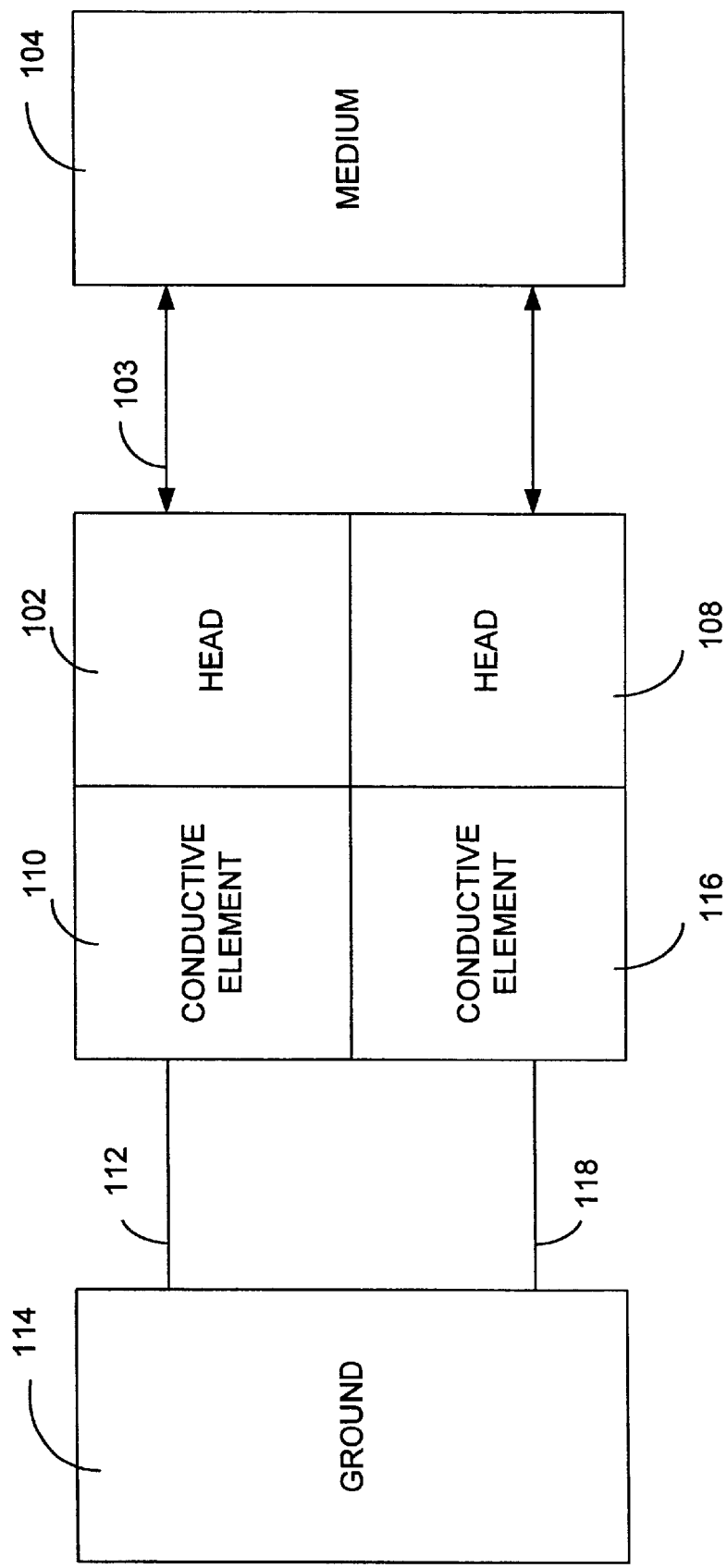
FIG. 1 is a conceptual block diagram of a disk drive that employs one or more conductive elements in accordance with the principles of the present invention.

The conceptual block diagram of FIG. 1 illustrates a magnetic recording/reproduction device 100 in accordance with the principles of the present invention. One or more magnetic heads 102 operate in close proximity to a magnetic medium 104 in order to read information 103 from or write information 103 to the medium 104. In a disk drive embodiment, that is, in a case where the recording/reproduction device 100 is a magnetic disk drive, the head 102 may be a flying head. Flying heads are known and discussed, for example, in U.S. Pat. Nos. 4,646,180 issued to Ohtsubo, 4,673,996, issued to White, 4,870,519 issued to White, 4,893,204 issued to Yamada et al., 4,894,740 issued to Chhabra et. al., and 5,200,868 issued to Chapin et. al., all of which are hereby incorporated by reference in their entirety.

Although the design of the head 102 may take on any one of many different forms, as evidenced by the above list of disk-head related patents, and may be a read head, a write head, or a read/write head, it will be referred to hereinafter as a head 102. Similarly, throughout the remainder of this description the recording/reproduction device 100 will be referred to as a disk drive 100. Operation of the disk drive 100 generates electromagnetic interference (EMI) in close proximity to the head 102, particularly during a write operation. An electromagnetic transducer (not shown) located on the head 102 is the source of the EMI. Additionally, a rotating disk, which acts as an antenna, may pick up EMI from various sources, thereby interfering with disk read operations. Such sources may include unshielded disk-write heads operating at other test stations in a disk-head or disk-drive test environment.

In a disk-drive testing environment, EMI generated by operation of the head 102 might interfere with the operation of one or more other heads 108 at other test stations. In accordance with the principles of the present invention, a conductive element 110 is positioned in close proximity to the head 102 in order to capacitively couple EMI energy from free space through a low-impedance path 112 to ground 114. The low impedance path 112 may include, for example, a wire, ribbon, or substantially planar member of highly conductive material connected between the conductive element and a structural member that is "at" the reference of interest, for example, a "grounded" head loading arm. The conductive element 110 and low-impedance path 112 may be formed in a manner that provides the greatest conductivity that is practicable, given cost, manufacturing and mechanical interference constraints. That is, for example, although a gold sheet may provide good conductivity, it may be too massive, too bulky, or too expensive for a particular application. Additional conductive elements 116 may be placed in close proximity to additional heads 108 and connected through low impedance paths 118 to the electromagnetic energy sink 114. Each head, whether a read-head or a write-head, may have a conductive element associated with it to capacitively couple EMI to ground. In the case of a write-head, the EMI is generated by the write head in the course of writing to a disk. In the case or a read-head, the EMI may be picked up by the associated disk, which acts as an antenna for EMI generated by write disks or other EMI sources. In a stand-alone disk drive implementation, although the disk drive 100 may include an enclosure 106 composed of a conductive material, such as metal, which ostensibly operates as a "Faraday cage" to eliminate EMI, EMI may still pose a problem, particularly within the enclosure 106.

Figure 2C:
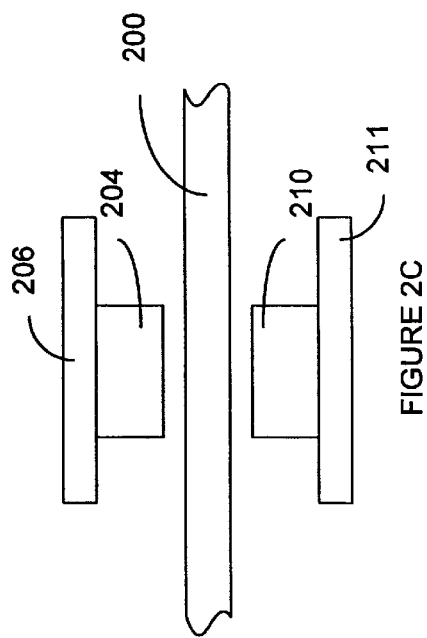
FIGS. 2A through 2C are diagrams of an "opposite side" conductive element embodiment in accordance with the principles of the present invention.
Figure 2B:
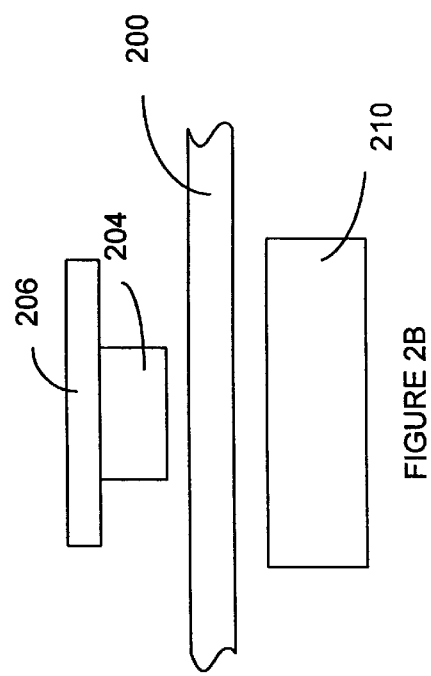
Figure 2A:
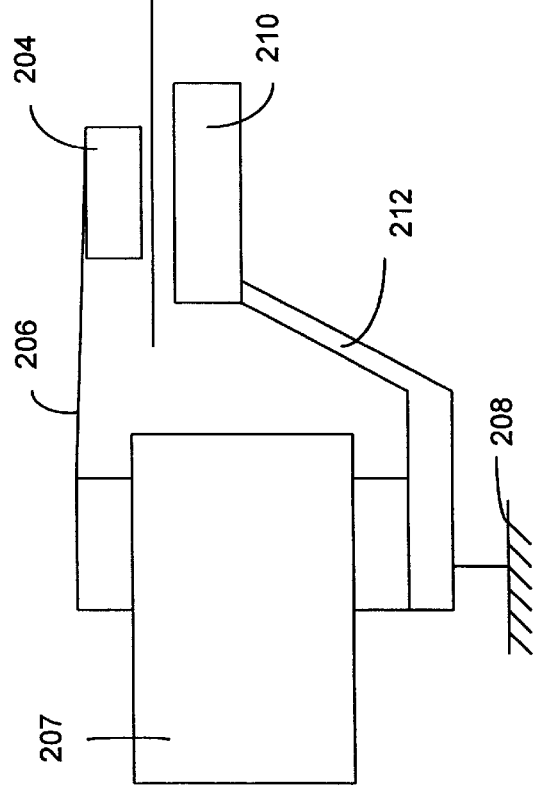

The landscape view of FIG. 2A provides a simplified schematic view of the major components of a disk drive test station in accordance with the principles of the present invention. That is, the elements of FIG. 2 are not drawn to scale, may appear to interfere with one another mechanically. In short, FIG. 2 is not meant to be taken as a mechanical schematic drawing. A disk 200 is supported and rotated by a spindle 202. A head 204 is supported by a loading arm 206, which is electrically connected to ground 208 through a conductive support 207. The head 204 may be supported by the loading arm 206 in a manner that permits the head 204 to fly, supported by an air bearing, in very close proximity to the disk 200 as the disk 200 rotates below the head 204. The loading arm 206 may employ, for example, a set of gimbals, flexures, and leaf springs to support the head 204. The disk test facility may include one or more additional heads (not shown) each of which might tend to generate EMI that could interfere with other disks. Although in this illustrative embodiment the head 204 is positioned above the disk 200, other embodiments with one or more heads positioned below the disk are within the scope of the invention.

In this illustrative embodiment, a conductive element 210 is positioned opposite the head 204 in close proximity to the disk 204. The conductive element 210 is electrically connected through a low impedance path 212 to ground 208. The low impedance path 212 may take the form of a wire, a strap, a ribbon, or a strut of conductive material attached between the conductive element 210 and the electrically conductive loading support 207, for example. The landscape endview of FIG. 2B provides an illustration of the vertical organization of the loading arm 206, head 204, disk 200, and conductive element 210 in an illustrative embodiment such as that of FIG. 2A. The landscape endview of FIG. 2C provides an illustration of the vertical organization of an embodiment in which the conductive element is supported in the same manner as the head. That is, this illustrative embodiment includes a separate loading arm 211 (which may include, for example, a set of gimbals, flexures, and leaf springs) employed to "fly" the conductive element 210 at substantially the same distance from the surface of the disk 200 as the head 204.

A disk test facility may include a plurality of heads 204 that may be write or read heads. The facility may test heads, disks, and/or various components of or complete disk drives. In such a facility, one or more of the heads may have associated with them corresponding conductive elements 210 placed in close proximity to the head 204 in order to capacitively couple EMI from the head (the electromagnetic transducer, to be more precise) to ground 208. Additionally, each head may have associated with it a plurality of conductive elements, with one or more on the same side of the disk as the head and/or one or more located on the opposite side of the disk from the head. Similarly, in a standalone disk drive embodiment, a variety of conductive element implementations may be employed to reduce susceptibility to EMI.

FIG. 3A depicts an embodiment of a disk drive in accordance with the principles of the present invention in which a head 304 and conductive element 310 are positioned on the same side of a disk 300. The disk 300 is supported and rotated by a spindle 302. The head 304 is supported by a loading arm 306, which is electrically connected to ground 308 through an electrically conductive support 307. The head 304 may be supported by the loading arm 306 in a manner that permits the head 304 to fly in very close proximity to the disk 300 as the disk 300 rotates below the head 304.

Although in this illustrative embodiment the head 304 is positioned above the disk 300, other embodiments with one or more heads positioned below the disk are within the scope of the invention. In this illustrative embodiment, a conductive element 310 is positioned on the same side of the disk 300 as the head 304. The conductive element 310 is electrically connected through a low impedance path to ground 308, via the support 307. The low impedance path may include a wire, a strap, a ribbon, or a strut of conductive material attached between the conductive element 310 and the electrically conductive support 307, for example. In a disk test facility a plurality of disk drives may include a plurality of read and write heads 304 operating independently, in which case, one or more of the heads may have associated with them corresponding conductive elements 310 placed in close proximity in order to capacitively couple EMI from the head to ground 308. FIG. 3B is a top plan view which illustrates the arrangement of support 307, head 304 and conductive element 310. The loading arm 306 may include, for example, a set of gimbals, flexures, or leaf springs employed to "fly" the head 304 above the disk 300.

FIG. 4A is a perspective view providing a more detailed depiction of the illustrative "opposite side" embodiment described in conjunction with the discussion of FIG. 2. The disk 200, head 204, and conductive element 210 are as previously described. The outline 400 of the head 204 projected onto the disk 200 will be referred to hereinafter as the footprint 400 of the head 204. The conductive element 210 is located on the opposite side of the disk 200 from the head 204 and extends an area that is at least substantially coextensive with the area of the footprint 400. In an illustrative embodiment, the conductive element is formed in a manner in which it flies at substantial the same distance from the disk 200 as the head 204. In such an embodiment, the surface area of the conductive element may be on the same order as that of the head 204. In an embodiment in which the conductive element is positioned farther from the disk 200, on the order of three to five mils, for example, the surface area of the conductive element may be substantially increased (to as much as a square inch, for example) in order to increase the capacitive coupling between the disk 200 and the conductive element 210.

In the sectional view of FIG. 4B as the disk 200 moves in a direction 401 the head 204 flies above the disk 200. The head 204 includes a magnetic transducer 402, which performs the actual reading and/or writing of data. A larger segment 404, referred to hereinafter as the head body 404, of the head 204 provides support for the transducer 402 and, as will be described in greater detail in relation to the discussion of FIG. 4C, forms the air bearing upon which the head 204 floats. In this illustrative embodiment the head 204 is supported by a gimbal mount 406 connected to a loading arm (not shown). In this illustrative embodiment, the conductive element 210 is a substantially planar device that is also supported by a gimbal mount 408 attached to a loading arm (not shown). The conductive element 210, gimbal mount 408, and loading arm are all electrically conductive and form a low impedance path to ground.

In operation, the distance "A" between the conductive element 210 and the disk 200 is minimized in order to increase the capacitive coupling between the head 204 and the conductive element 210. The distance A may be reduced substantially (thereby increasing the capacitive coupling efficiency) by flying the conductive element on an air bearing in close proximity to the disk 200 in the same manner that the head 204 is flown above the disk 200. The length B and width C of the conductive element 210 may approximate the length and width of the head 204. Better capacitive coupling may be achieved through use of a conductive element 210 whose length and width exceed the respective dimensions of the head 204. Additionally, although the conductive element is positioned directly below the head 204 in this illustrative embodiment, better capacitive coupling efficiency may be achieved by placing the conductive element 210 in a position in which the conductive element is substantially centered on the vertical axis AX1 of the transducer 402. Although not shown in this illustrative embodiment, as is known in the art, the leading edges of the head 204 may be tapered to form the air bearing upon which the head 204 flies. Similarly, the leading edges of the conductive element may be tapered to form or enhance the development of such an air bearing.

The plan view of FIG. 4C illustrates structure that may be employed in a conductive element 210 in accordance with the principles of the present invention. In this illustrative embodiment, the conductive element 210 includes rails 410 and channels 412 which serve to form the air bearing upon which the conductive element 210 may ride and, at the same time, to channel away excess air trapped between the conductive element 210 and the disk 200. Although the conductive element 210 is a passive device, meant to capacitively couple EMI from the disk 200 through a low impedance path (e.g., path 212) to ground, the illustrative embodiment of FIG. 4C incorporates features of a head, such as rails 410 and channels 412 that may be used to form an air bearing which thereby position the conductive element in very close proximity to the disk 200. Any of various head topographies may be employed to produce the desired suspension of the conductive element.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. The foregoing description of specific embodiments of the invention has been presented for the purposes of illustration and description. It is not intended to be exhaustive or to limit the invention to the precise forms disclosed, and many modifications and variations are possible in light of the above teachings. The embodiments were chosen and described to best explain the principles of the invention and its practical application, and to thereby enable others skilled in the art to best utilize the invention. It is intended that the scope of the invention be limited only by the claims appended hereto.

What is claimed is:

1. A magnetic head assembly for reading and/or writing information from/to a magnetic medium on a rotatable disk, said disk having first and second sides, comprising:

a magnetic head and loading arm affixed thereto, said magnetic head being selectively positionable opposite said magnetic medium and configured to read information from or write information to said magnetic medium; and an electrically conductive element mechanically coupled to said loading arm and adapted to capacitively couple electromagnetic interference (EMI) arising from the operation of said magnetic head and to conduct the energy from said EMI to an electromagnetic energy sink.

2. The magnetic head assembly of claim 1 wherein the conductive element is positioned substantially directly opposite the head on the opposite side of the magnetic disk from the side on which the head is located.

3. The magnetic head assembly of claim 1 wherein the conductive element is positioned near the magnetic disk on the same side of the magnetic disk as the head is located.

4. The magnetic head assembly of claim 1 wherein the conductive element is a substantially planar element held in such close proximity to the disk as mechanical tolerances will permit.

5. The magnetic head assembly of claim 1 wherein the conductive element is configured to be positioned a distance away from the surface of the magnetic disk medium by an air bearing.

6. The magnetic head assembly of claim 5 wherein the conductive element comprises a pair of coplanar side rails on the sides of an air-bearing surface.

7. The magnetic head assembly of claim 1 wherein the electromagnetic energy sink potential is ground.

8. The magnetic head assembly of claim 1 further comprising a second conductive element positioned to capacitively couple electromagnetic interference (EMI) arising from the operation of said head and to conduct the energy from said EMI to an electromagnetic energy sink, the second conductive element positioned on the opposite side of the magnetic disk medium from the first conductive element.

9. The magnetic head assembly of claim 8 wherein the conductive element comprises a pair of coplanar side rails mounted on the sides of an air-bearing surface.

10. The magnetic head assembly of claim 3 wherein said conductive element substantially surrounds the head body.

11. The magnetic head assembly of claim 1 wherein said conductive element is composed primarily of a metallic material.

12. The magnetic head assembly of claim 1 further comprising a low impedance connection between the conductive element and a loading arm used to support the head.

13. The magnetic head assembly of claim 1 further comprising a plurality of heads, each head having an associated conductive element positioned to capacitively couple electromagnetic interference (EMI) arising from the operation of said head and to conduct the energy from said EMI to an electromagnetic energy sink.

14. A magnetic disk assembly comprising:
a magnetic disk having a magnetic medium bearing surface disposed about a central axis;
an associated driver for rotating said disk about said central axis;
a read and/or write head;
a support assembly including a loading arm for positioning said head adjacent to and separated from said magnetic medium-bearing surface of said disk, as said disk is rotated by said driver; and
an electrically conductive element mechanically coupled to said loading arm and adapted to capacitively couple electromagnetic interference (EMI) arising from the operation of said magnetic head and to conduct the energy from said EMI to an electromagnetic energy sink.

15. The magnetic disk assembly of claim 14 further comprising a low impedance connection between said conductive element and said loading arm.

16. The magnetic disk assembly of claim 14 wherein the conductive element is positioned substantially directly opposite the head on the opposite side of the magnetic disk from the side on which the head is located.

17. The magnetic disk assembly of claim 14 wherein the conductive element is positioned near the magnetic disk on the same side of the magnetic disk as the head is located.

18. The magnetic disk assembly of claim 14 wherein the conductive element is a substantially planar element held to within five mils of the conductive disk surface.

19. The magnetic disk assembly of claim 14 wherein the conductive element is configured to be positioned a substantially fixed distance away from the surface of the magnetic disk medium by an air bearing.

20. The magnetic disk assembly of claim 19 wherein the conductive element comprises a pair of coplanar side rails on the sides of an air-bearing surface.

21. The magnetic disk assembly of claim 14 wherein the electromagnetic energy sink potential is ground.

22. The magnetic disk assembly of claim 14 further comprising a second conductive element positioned to capacitively couple electromagnetic interference (EMI) arising from the operation of said head and to conduct the energy from said EMI to an electromagnetic energy sink, the second conductive element positioned on the opposite side of the magnetic disk medium from the first conductive element.

23. The magnetic disk assembly of claim 22 wherein the second conductive element comprises a pair of coplanar side rails mounted on the sides of an air-bearing surface.

24. The magnetic disk assembly of claim 17 wherein said conductive element substantially surrounds the body of the head.

25. The magnetic disk assembly of claim 14 wherein said conductive element is composed primarily of a metallic material.

26. The magnetic disk assembly of claim 14 further comprising a low impedance connection between the conductive element and the loading arm.

27. The magnetic disk assembly of claim 14 further comprising a plurality of heads, each head having an associated conductive element positioned to capacitively couple electromagnetic interference (EMI) arising from the operation of said head and to conduct the energy from said EMI to an electromagnetic energy sink.

28. A method of reducing EMI within a disk drive having a magnetic disk recording medium and one or more heads each including at least one electromagnetic transducer, comprising the steps of:
A) electrically connecting a conductive element to an electromagnetic sink through a low impedance conductive path; and
B) positioning the conductive element in close proximity to a head to capacitively couple EMI from the head to said electromagnetic sink.

29. The method of claim 28 wherein the positioning of step (B) includes placing the conductive element on the opposite side of the disk from the head.

30. The method of claim 28 wherein the positioning of step (B) includes placing the conductive element on the same side of the disk as the head.

31. The method of claim 28 wherein the connecting of step (A) further comprises the connection of a plurality of conductive elements through one or more low impedance paths to one or more electromagnetic sinks.

32. The method of claim 28 wherein the electrical connection of step (A) is a connection between a conductive element and ground.

\* \* \* \* \*

UNITED STATES PATENT AND TRADEMARK OFFICE
CERTIFICATE OF CORRECTION

PATENT NO. : 6,661,607 B2
DATED : December 9, 2003
INVENTOR(S) : Anatoli B. Stein It is certified that error appears in the above-identified patent and that said Letters Patent is hereby corrected as shown below:

<u>Column 6,</u>
Line 59, after "reading", delete "andior", and insert thereof -- and/or --.

Signed and Sealed this

Sixteenth Day of March, 2004

JON W. DUDAS
*Acting Director of the United States Patent and Trademark Office*